Patented Nov. 15, 1938

2,136,428

UNITED STATES PATENT OFFICE 2,136,428

UNSYMMETRICAL MODIFIED LEUCO DERIVATIVES OF INDIGOID DYES

Arthur Lawrence Fox, Woodstown, N. J., assignor to E. I. du Pont de Nemours & Company, Wilmington, Del., a corporation of Delaware No Drawing. Application October 21, 1935, Serial No. 46,055

3 Claims. (Cl. 260—322)

This invention relates to new and improved indigoid dye reduction products and compositions, more particularly reduction products and compositions of unsymmetrical indigoid dyes having dissimilar heterocylic nuclei, and a process for the preparation thereof.

The present application is a continuation-in-part of my co-pending applications Serial Nos. 635,198 filed September 28, 1932, and 721,413 filed April 19, 1934.

It is well known that indigoid dyes may be reduced to their so-called leuco compounds which are soluble in aqueous caustic alkalis and that these leuco compounds are readily converted to the original dye upon oxidation, even such as is accomplished by the action of air. This fact has been taken advantage of in the dyeing industry, wherein the indigoid dye is customarily treated with an aqueous solution containing a reducing agent and strong caustic alkali in sufficient amount to produce a vat containing the soluble leuco compound. The materials to be dyed are dipped in the vat so produced and then exposed to the air, whereupon the oxygen in the air oxidizes the leuco compound to the original dye. In such a process, it has always been regarded as necessary to employ a strong caustic alkali such as sodium and potassium hydroxides in order to produce the soluble leuco compound.

It is an object of the present invention to produce new and improved modified leuco compounds from unsymmetrical indigoid dyes having dissimilar heterocyclic nuclei which are generally stable to air and insoluble in water. A further object is to produce new and improved dye reduction products and compositions which are valuable in printing processes. A still further object is to provide a new and improved process for producing products of the type above described. Other objects will appear hereinafter.

These objects are accomplished in accordance with my invention which comprises treating an unsymmetrical indigoid dye having dissimilar heterocyclic nuclei with an aqueous solution of a reducing agent such as has been previously utilized, but in the absence of added alkali. In other words, the reduction of the indigoid dye is carried out in substantially the same manner as has previously been the practise, except that no alkali is added or employed other than that naturally present in the reducing agent. The alkali, if any, naturally present in the reducing agent will be insufficient as a general rule to give the solution an alkaline reaction and in fact, when sodium hydrosulfite is employed, the solution appears to have a slightly acid reaction.

The substances produced in accordance with this invention are generally stable towards oxidation by air. However, the stability of the various products varies somewhat. Also, in some cases, it is advantageous to acidify the products once produced, preferably immediately after they are formed, to render them still more stable against oxidation, employing a non-oxidizing acid such as hydrochloric, sulfuric, acetic, carbonic and sulfurous acids for this purpose.

The reducing agents to be employed preferably comprise sodium hydrosulfite, although other equivalent reducing agents ordinarily employed for reducing indigoid dyes, such as sodium formaldehyde sulfoxylate, may be used wholly or in part.

The temperatures at which the reduction is caused to take place may vary within a rather wide range but should generally be maintained above about 50° C., and it will usually be found expedient to employ temperatures not above those necessary for boiling. Under atmospheric conditions, however, I have found temperature of from 70° to 100° C. to be the preferable temperatures, 70° being the most practical and efficient. If desired, higher or lower temperatures may be employed.

When the reduction of an indigoid dye having dissimilar heterocyclic nuclei is accomplished in accordance with the above described conditions, a product is formed which has a color greatly different from that of the original dye and which is generally insoluble in water and stable towards oxidation by the oxygen of the air. These products are valuable in printing processes when made up into pastes.

Since the specific reactions which take place during the reduction accomplished in accordance with my invention are not definitely known and the chemical structure of the resulting products is also not definitely known, no attempt is made at the present time to give any theoretical description of the reactions taking place or of the structural formulas of the materials produced. In my co-pending application Serial No. 46,054 filed of even date herewith, I have described certain other modified leuco compounds which are also stable to air, insoluble in water and yield prints in the usual manner but with smaller amounts of reducing agent. In general, however, the products of said application do not appear to be as stable to the oxygen of the air as the products of the present application. For instance, the products of the aforesaid application nearly always undergo what may be termed a "secondary" oxidation, the freshly formed color changing almost immediately on exposure to air to a darker color. This secondary color change of the freshly formed product does not usually occur with the products of the present invention. Furthermore, the shade of the stable leuco derivative prepared in accordance with the present application often differs pronouncedly from the shade of the leuco derivative prepared in accordance with the aforesaid co-pending application.

The solubility in alkalis may also differ. Thus, while the products of the present invention prepared in the absence of alkalis and those of my co-pending application prepared in the presence of insufficient alkali for vatting are generally insoluble in cold, dilute (3%) sodium hydroxide, some of the products of the present invention are soluble in cold, dilute sodium hydroxide whereas the reduction products from the corresponding dyes prepared in the presence of an alkali are insoluble. This is true in spite of the apparently greater stability of the products of the present invention to oxidation.

The invention will be more fully understood, but is not limited by the following examples in which the quantities are stated in parts by weight. In each example the modified leuco derivative was filtered off, washed with dilute hydrochloric acid and color changes noted. Its color in sulfuric acid was immediately determined and then it was allowed to stand in open air for seventy-two hours, after which its color in sulfuric acid was again determined. Also, the stability of these modified leuco derivatives to cold and hot dilute alkali was examined.

Example I

One part of dry 2-(5:7-dibromindol)-2'-6-chlor-7-methyl-thionaphthene indigo having the formula

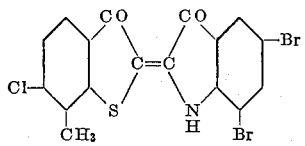

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye powder was purple, and that of the stable leuco grey changing to grey black on contact with air. The color of the original dye in sulfuric acid was very blue green, and that of the freshly prepared stable leuco green. On standing seventy-two hours in contact with air, the color of the stable leuco was dull grey lavender which gave a green color in sulfuric acid. This was not affected by cold 3% sodium hydroxide, but did dissolve at least in part on warming.

Example II

One part of dry 2-(5:7-dibromindol)-2'-5:7-dimethyl-thionaphthene indigo having the formula

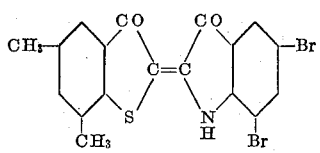

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye powder was very dark blue, and that of the stable leuco blue black changing to black on contact with air. The color of the original dye in sulfuric acid was very blue green, and that of the freshly prepared stable leuco green. After standing seventy-two hours in air, the stable leuco was violet black in color, giving a blue green in sulfuric acid. The stable leuco was not affected by cold 3% sodium hydroxide, but did dissolve at least in part on warming.

Example III

One part of dry 2-(5:7-dibromindol)-2'-4-methyl-thionaphthene indigo having the formula

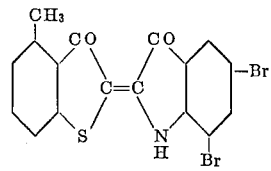

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was purple, and that of the stable leuco green, which did not change on contact with air. The color of the original dye in sulfuric acid was dirty blue, and that of the freshly prepared stable leuco brownish green. After standing seventy-two hours in air, the stable leuco was light grey green in color and gave a brownish green in sulfuric acid. It was not affected by cold 3% sodium hydroxide, but did dissolve at least in part on warming.

Example IV

One part of dry 2-(5:7-dibromindol)-2'-4-methyl-bromthionaphthene indigo having the formula

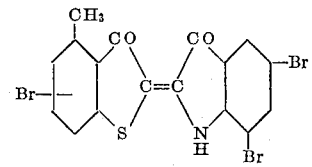

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was purple, and that of the stable leuco blue black changing to deep blue on contact with air. The color of the original dye was green blue in sulfuric acid, and that of the freshly prepared stable leuco green. After standing seventy-two hours, the color of the stable leuco was deep lavender, and in sulfuric acid blue green. This stable leuco was not affected by cold 3% sodium hydroxide, but did dissolve at least in part on warming.

Example V

One part of dry 2-(5:7-dibromindol)-2'-4-chlor-7-methyl-thionaphthene indigo having the formula

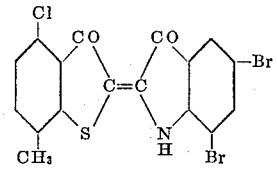

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was purple, and that of the stable leuco dull blue which did not change on contact with air. The original dye gave a very bright pure blue in sulfuric acid, and the freshly prepared stable leuco gave a deep green. On standing seventy-two hours in air, the stable leuco was dull blue in color, and gave a dirty green in sulfuric acid. It was not affected by hot or cold 3% sodium hydroxide.

*Example VI*

One part of dry 2-(5:7-dibromindol)-2'-5-methyl-thionaphthene indigo having the formula

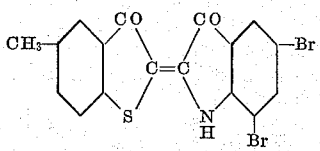

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was purple, and that of the stable leuco dull blue, which did not change on contact with air. The original dye gave a bright pure blue in sulfuric acid, and the freshly prepared stable leuco gave an apple green color. After standing seventy-two hours in contact with air, the stable leuco was dull blue, and gave a pure green in sulfuric acid. This stable leuco was dissolved at least in part by cold or hot 3% sodium hydroxide.

*Example VII*

One part of dry 2-(5:7-dibromindol)-2'-7-chlor-thionaphthene indigo having the formula

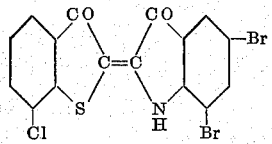

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was purple, and that of the stable leuco dull lavender, which did not change on contact with air. The original dye gave a pure blue in sulfuric acid, while the freshly prepared stable leuco gave a blue green. On standing seventy-two hours in air, the stable leuco was violet in color and gave a blue green in sulfuric acid. It was dissolved at least in part by cold or hot 3% sodium hydroxide.

*Example VIII*

One part of dry 2-(5:7-dibromindol)-2'-4:5:6:7-tetramethyl-thionaphthene indigo having the formula

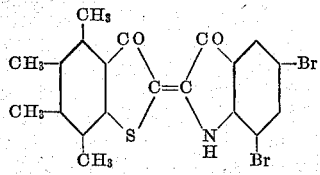

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The original dye was purple, and the stable leuco was grey green which did not change on contact with air. The original color gave a dirty green in sulfuric acid, and the freshly prepared stable leuco gave a brown. After standing seventy-two hours in air, the stable leuco was dull and violet in color, and gave a brownish green in sulfuric acid. It was not affected by cold 3% sodium hydroxide, but did dissolve at least in part on warming.

*Example IX*

One part of dry 2-(5:7-dibromindol)-2'-4:7-dimethyl-5-chlor-thionaphthene indigo having the formula

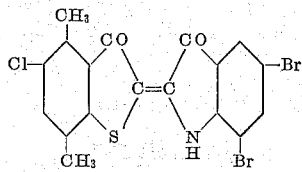

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was purple, and that of the stable leuco was grey changing to steel grey on contact with air. The original dye gave a blue green in sulfuric acid, and the freshly prepared stable leuco an apple green. After standing seventy-two hours in air, the stable leuco was dull lavender in color, and gave a yellow green in sulfuric acid. It was not affected by cold 3% sodium hydroxide, but did dissolve at least in part on warming.

*Example X*

One part of dry 2-(5:7-dibromindol)-2'-4-methyl-5-brom-7-isopropyl-thionaphthene indigo having the formula

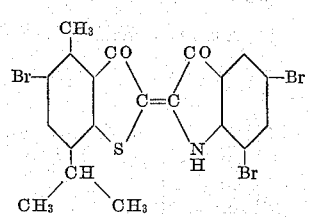

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was reddish, and that of the stable leuco black, which did not change on contact with air. The original dye gave a blue green color in sulfuric acid, and the freshly prepared stable leuco yellow green. After standing seventy-two hours in contact with air, the stable leuco was violet black in color, and gave a blue green in sulfuric acid. It was dissolved at least in part by cold or hot 3% sodium hydroxide.

Example XI

One part of dry acenaphthene-4-chlor-7-methyl-thionaphthene indigo having the formula

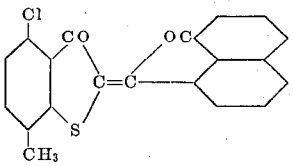

was heated on a boiling water bath with 2 parts of sodium hydrosulfite in 50 parts of water until reduction was observed by the color change. The modified leuco derivative which precipitated was filtered, washed with dilute hydrochloric acid, and color changes noted.

The color of the original dye was red, and that of the stable leuco brick red, which did not change on contact with air. The original dye gave a bright pure green in sulfuric acid, and the stable leuco gave a dirty green. After standing seventy-two hours, the stable leuco was brick red in color and gave a dirty green in sulfuric acid. It was not affected by cold 3% sodium hydroxide, but was dissolved at least in part on warming.

Example XII

A mixture of the following ingredients was prepared:

1 part of 2-(5:7-dibromindol)-2'-4:7-dimethyl-thionaphthene indigo
50 parts of water
2 parts of sodium hydrosulfite These were heated together at the boil until reduction of the dye was observed by the color change. The modified leuco which precipitated was filtered off, washed with dilute hydrochloric acid and color changes noted.

The original color of the dye powder was violet. The modified leuco color was reddish-brown grey, which changed to blue on short contact with air. Its color in sulfuric acid was green, while that of the original dye was blue. After standing seventy-two hours, the color of the modified leuco was blue and in sulfuric acid blue green. The stable leuco was very slightly affected by cold 3% sodium hydroxide and dissolved on heating the same.

Example XIII

A mixture of the following ingredients was prepared:

200 parts of 2-(5:7-dibromindol)-2'-4-methyl-6-chlorothio-naphthene indigo
400 parts of alcohol
50 parts of sodium hydrosulfite These were heated under reflux for two hours. At first, a brown precipitate formed, then this turned to green. After two hours, water was added and the alcohol distilled off. The product was filtered and washed. A small portion was removed and the remainder washed with dilute hydrochloric acid.

On contact with air the product changed from green to blue. Its color in sulfuric acid was pure green and remained so even after standing in open air all night.

The reaction medium is a liquid in which the stable leuco derivative is insoluble. Thus, aqueous or alcoholic media may be used. Entirely aqueous media or aqueous solutions of alcohol and water in which the water preponderates will give good results. Commercial alcohol containing the usual proportions of water may be used satisfactorily.

The heating is effected until the formation of the air-stable leuco derivative is observed either by color change of the dye or by examining a test sample. The time may vary, for example, from fifteen minutes to four hours.

The products of the invention which are normally prepared in an acidic medium are practically always air-stable as soon as formed. If further acidification is desired, the acid may be added immediately to the reaction mixture, with or without further heating, or subsequently when the product has been separated.

It will be noted that the dye reduction products of Examples VI, VII and X when prepared by reduction with sodium hydrosulfite alone yielded products perfectly air-stable for seventy-two hours but easily dissolved at least in part by cold 3% sodium hydroxide.

It will be apparent that the invention is applicable to the preparation of other unsymmetrical indigoid dyes having dissimilar heterocyclic nuclei, including particularly the substituted derivatives of 2:2'-thionaphthene-indolindigos, 2-thionaphthene-3'-indolindigos, 2-indol-acenaphthene indigos, 2-thionaphthene-acenaphthene indigos, and similar unsymmetrical indigoid dyestuffs as described, for example, by Truttwin, "Enzyklopädie der Küpenfarbstoffe". Further specific examples are 2-(5:7-dibromindol)-2'-(4'-methyl-6'-chloro)-thionaphthene indigo, 6-ethoxy-2-thionaphthene-acenaphthene indigo, beta-naphtho-quinone-2-indolindigo and 4-bromo-2-alpha-naphthol-thionaphthene indigo.

The term "indigoid" is used generically and includes dyes which contain the grouping

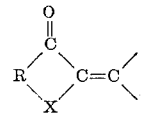

wherein R is an aromatic nucleus, and X represents NH, S or Se.

In general, the preferred products of the invention are those prepared from dyestuffs containing non-reducible substituents such as, for example, halogen atoms, alkyl groups and alkoxy groups in one or more of their aromatic nuclei. Special combinations of substituents may produce especially desirable dye reduction products, depending upon the properties desired. Thus, the dye reduction products of Examples III, V, VI, VII, VIII, X and XI appear to be very air stable because the freshly prepared product undergoes no substantial color change on exposure to air. The products of Examples VI, VII and X are soluble at least in part in both cold and hot 3% caustic soda solution. The products of Examples III, IV and IX are insoluble in cold 3% sodium hydroxide but are soluble at least in part in hot 3% sodium hydroxide. The process has been found to be advantageous in the preparation of all mono-substituted derivatives, for instance, those containing chlorine or methyl groups in the 4-, 5-, 6- and 7- positions of the thionaphthene nucleus; also, in the preparation of disubstituted derivatives, particularly those containing a halogen atom and an alkyl group in the same nucleus. Examples have also been given of tri- and tetra-substituted derivatives. The aromatic nucleus may contain more than one carbocyclic ring, as, for instance, naphthionaphthene and naphthisatin nuclei either substituted or unsubstituted. The isatin nucleus may contain substituents similar to those contained in the thionaphthene nucleus.

The terms "alkyl" and "alkoxy" are used throughout the specification and claims in their usual sense and are intended to cover such radicals as methyl, ethyl, allyl, isopropyl, butyl, methoxy, ethoxy, butyloxy and the higher alkyl and alkoxy radicals.

Dye compositions may be prepared by mixing the stable leuco derivative in dry or paste form with auxiliary agents such as metal compounds, for instance, the oxides and salts of iron, and agents such as diethylene glycol. Especially desirable results have been obtained in printing dye compositions containing the stable leuco derivative together with both diethylene glycol and an iron salt. Dispersing agents such as, for example, alkali metal salts of the condensation product of formaldehyde with sulfonated naphthalene may be included in the dye composition.

In the preparation of printing pastes, the usual auxiliary agents such as alkalis, e. g., sodium hydroxide, sodium carbonate and/or potassium carbonate, reducing agents as, for instance, sodium formaldehyde sulfoxylate, glucose or preserver's syrup, hygroscopic agents such as glycerin, and thickeners may be employed.

A representative printing paste may be prepared by mixing the following ingredients:

20.0 parts of an 8% suspension of the modified leuco body
9.1 parts of potash
6.6 parts of sodium formaldehyde sulfoxylate
10.0 parts of glycerin
54.3 parts of thickener The thickener employed is prepared by mixing:

1 part of wheat starch
3 parts of British gum
4 parts of water
1 part of gum tragacanth (6% solution)

This mixture is boiled for ten to fifteen minutes and then cooled, whereupon it is ready for incorporation in the paste.

The paste prepared as above is printed on the desired material, allowed to dry and aged for about five minutes at about 214°–216° F. The material is then subjected to oxidation, rinsed, soaped, rinsed again, and then dried.

Preferred dye compositions are those containing at least 0.5% diethylene glycol, based on the weight of the dye, and about 0.1 to about 5.0% of a metal salt such as an iron salt. Smaller or larger proportions of these ingredients may be used; for instance, the amount of diethylene glycol may be as much as four times the weight of the dye paste. A typical printing paste containing diethylene glycol instead of glycerin has the following composition:

20 parts of the stable reduction product (12.5% paste)
17 parts of potash
12 parts of sodium formaldehyde sulfoxylate
3 parts of diethylene glycol
48 parts of thickener If desired, one-half or one-third as much sodium formaldehyde sulfoxylate may be employed with the corresponding increase in the amount of thickener. The stable leuco bodies have also been printed without any reducing agent, for instance, by the use of the following representative printing paste:

(A) 20 parts of the stable reduction product (12.5% paste)
20 parts of potash
3 parts of diethylene glycol
57 parts of thickener (B) 20 parts of the stable reduction product (12.5% paste)
10 parts of potash
3 parts of diethylene glycol
65 parts of thickener
2 parts of sodium hydroxide Improved results are obtained by the addition of 1% of $FeCl_2.4H_2O$ to any of the above identified dye compositions.

The invention is especially advantageous in providing new and improved dyestuffs and dye compositions. These new and improved dye reduction products and dye compositions are particularly useful in printing and make possible the production of stronger and brighter prints than heretofore obtainable from the dyestuff proper. Furthermore, they may be printed with smaller amounts of reducing agent, which is an advantage to the consumer.

As many apparently widely different embodiments of this invention may be made without departing from the spirit and scope thereof, it is to be understood that I do not limit myself to the specific embodiments thereof except as defined in the appended claims.

I claim:

1. The process of preparing reduction products of thionaphthene indolindigoid dyes which comprises reducing a thionaphthene indolindigoid dye which is mono-substituted in the aromatic portion of the thionaphthene nucleus by a substituent selected from the group consisting of halogen, lower alkyl and lower alkoxy radicals, with an alkali metal hydrosulfite reducing agent in an aqueous medium in the absence of added alkalies and which is acidic during the reduction.

2. The process of preparing reduction products of thionaphthene indolindigoid dyes which comprises reducing a thionaphthene indolindigoid dye di-substituted by two different substituents selected from the group consisting of halogen, lower alkyl and lower alkoxy radicals, with an alkaline metal hydrosulfite reducing agent in an aqueous medium in the absence of added alkalies and which is acidic during reduction.

3. The process of preparing stable reduction products of unsymmetrical thionaphthene-indole-indigoid dyes which comprises reducing an unsymmetrical thionaphthene-indole-indigoid dye having dissimilar heterocyclic nuclei solely with an alkali metal hydrosulfite reducing agent in aqueous medium until a change of color is brought about and a stable reduction product is produced, but not until the dye is transformed to a soluble form, and then separating the product.

ARTHUR L. FOX.